US008903896B2

(12) United States Patent
Egawa et al.

(10) Patent No.: US 8,903,896 B2
(45) Date of Patent: Dec. 2, 2014

(54) CLIENT TERMINAL, CONTENT UTILIZING SYSTEM, AND DATA TRANSMITTING/RECEIVING METHOD

(75) Inventors: Manabu Egawa, Osaka (JP); Hideaki Takechi, Osaka (JP); Hideo Morita, Osaka (JP)

(73) Assignee: Panasonic Corporation, Osaka (JP)

( * ) Notice: Subject to any disclaimer, the term of this patent is extended or adjusted under 35 U.S.C. 154(b) by 241 days.

(21) Appl. No.: 13/450,977

(22) Filed: Apr. 19, 2012

(65) Prior Publication Data

US 2012/0203829 A1 Aug. 9, 2012

Related U.S. Application Data

(63) Continuation of application No. PCT/JP2010/003426, filed on May 21, 2010.

(30) Foreign Application Priority Data

Nov. 13, 2009 (JP) ................................. 2009-259620

(51) Int. Cl.
*G06F 15/16* (2006.01)
*G06Q 30/00* (2012.01)

(52) U.S. Cl.
CPC ...................................... *G06Q 30/00* (2013.01)
USPC ........................................... 709/203; 709/201

(58) Field of Classification Search
CPC ................................................. H04L 29/06027
USPC .......................................................... 709/203
See application file for complete search history.

(56) References Cited

U.S. PATENT DOCUMENTS

| | | | | |
|---|---|---|---|---|
| 7,089,279 | B1 | 8/2006 | Sakaguchi | |
| 2006/0195545 | A1* | 8/2006 | Kikkawa et al. | 709/217 |
| 2010/0262676 | A1* | 10/2010 | Tanaka | 709/219 |

FOREIGN PATENT DOCUMENTS

| | | |
|---|---|---|
| JP | 11-85693 | 3/1999 |
| JP | 2004-192563 | 7/2004 |
| JP | 2004-264933 | 9/2004 |
| JP | 2009-181417 | 8/2009 |
| WO | 2009/081582 | 7/2009 |

OTHER PUBLICATIONS

International Search Report issued Aug. 10, 2010 in International Application No. PCT/JP2010/003426.

English translation of "Informal Comments for International Search Opinion on International Application No. PCT/JP2010/003426", filed in response to the Written Opinion issued Aug. 10, 2010 in International Application No. PCT/JP2010/003426.

* cited by examiner

*Primary Examiner* — Wing F Chan
*Assistant Examiner* — Andrew Woo
(74) *Attorney, Agent, or Firm* — Wenderoth, Lind & Ponack, L.L.P.

(57) ABSTRACT

A client terminal comprises a first application unit which transmits and receives data to and from a server, and a second application unit which transmits and receives data to and from the first application unit. An instruction transmitting unit in the second application unit transmits a user's instruction to the first application unit, and a state holding and transmitting unit transmits state information of the second application unit to the first application unit. A request generation unit in the first application unit generates a request command for the server based on the instruction received from the instruction transmitting unit, a state addition unit adds the state information received from the state holding and transmitting unit to the request command, and a request transmitting unit transmits the request command to which the state information is added to the server.

9 Claims, 12 Drawing Sheets

FIG.11

```
GET /www.example.co.jp/ex/ HTTP/1.1

HTTP HEADER

X-terminal-spec:
    monitor-resolution=1920-1080;
                screen-size=15inch;
          storage-quantity=2048mb;
```

CLIENT TERMINAL, CONTENT UTILIZING SYSTEM, AND DATA TRANSMITTING/RECEIVING METHOD

CROSS-REFERENCE TO RELATED APPLICATIONS

This application is a continuation application of PCT International Patent Application No. PCT/JP2010/003426 filed May 21, 2010, claiming the benefit of priority of Japanese Patent Application No. 2009-259620 filed Nov. 13, 2009, all of which are incorporated by reference herein in their entirety.

FIELD OF THE INVENTION

The present invention relates to a client terminal, a content utilizing system, a data transmitting/receiving method and the like, by which the client terminal acquires and uses a content offered by the server through a network.

BACKGROUND OF THE INVENTION

In recent years, a technology of a "Web service" has been used widely, by which a processing demand in the form of Web API from a CE apparatus (hereafter, this is expressed as a "client terminal") is transmitted to a server, the server performs processing according to the Web API, and the server returns the result to the client terminal. Formerly, the processing demand is transmitted to the server by using a Web browser and the result is shown to a user by the Web browser. However, when the system of the Web service is used, the client does not need to be a Web browser, and the processing result by the server can be used by an application.

In the Web service, a query form such as "http://www.example.co.jp/web-api?user=taro" is generally used. In the query form, data which is desired to be notified to the server from the client is described after the URL of Web API, such as "?user=taro".

Thus, the Web service realizes communication between two elements which are the server and the application of the client terminal.

In the conventional general server client system by which a user operates a browser and transmits a request to the server, the user operates the browser and transmits the request to the server.

In such general conventional server client systems, such server client system is proposed that by a notice of a state of the browser to the server by the query form, the server makes the client display a screen according to the state of the browser (see for example Japanese Patent Application Laid-Open No. H11-085693).

In such a general conventional server client system, communication is performed between two elements which are the server and the browser of the client terminal.

On the other hand, at the client terminal, there are problems such as operability and operation speed. As one of a number of solutions, it is considered that a different exclusive application from the browser performs a part of processing, such as retrieval or search of the contents, in order to increase usability.

DISCLOSURE OF THE INVENTION

Problems to be Solved by the Invention

However, in the conventional communication method between the server and the client terminal, a state of the exclusive application cannot be handed over to the browser.

In order to increase the usability by making a different exclusive application from the browser perform a part of processing such as retrieval or search of the contents, it is necessary to hand over the state of the exclusive application to the browser. Furthermore, it is necessary to notify the state of the exclusive application handed over to the browser, to the server.

However, in the above-mentioned conventional communication method, communication only between such two elements which are the server and the browser of the client terminal or which are the server and the application of the client terminal, can be performed. Thus, the state of the exclusive application cannot be handed over to a browser to be notified to the server.

In view of the above-mentioned conventional problems, an object of the present invention is to provide a client terminal, a content utilizing system, a data transmitting/receiving method and the like, which can make state information of a second application of a client terminal be handed over to a first application which has a browser function, and can notify the state information to the server smoothly.

SUMMARY OF THE INVENTION

The 1$^{st}$ aspect of the present invention is a client terminal which acquires a content from a server connected through a network to the client terminal and uses the content, the client terminal comprising:

a first application unit which transmits and receives data to and from the server; and a second application unit which transmits and receives data to and from the first application unit;

the second application unit including:

a content information acquiring unit which acquires content information about the content beforehand;

an instruction transmitting unit which transmits an instruction to the first application unit to process a work derived from the content information; and a state holding and transmitting unit which holds state information indicating a state of the second application unit and transmits the state information to the first application unit;

the first application unit including:

a request generation unit which generates a request command for the server, based on the instruction received from the instruction transmitting unit;

a state addition unit which adds the state information received from the state holding and transmitting unit, to the request command generated by the request generation unit; and a request transmitting unit which transmits the request command to which the state information is added, to the server.

The 2$^{nd}$ aspect of the present invention is the client terminal according to the 1$^{st}$ aspect of the present invention, wherein the request command which is generated by the request generation unit is an HTTP request; and the state addition unit adds the state information to an extension area of a header of the HTTP request.

For realizing to hand over information indicating the state of the first application unit to the second application unit and to hand over the information to the server, the standardized extension header of the HTTP request is used instead of using the query system in which an original definition is required at both the server and the client terminal. Therefore, even a server which cannot interpret the state of the first application unit handed over by the second application unit does not display an error and can realize continuing the process.

The 3rd aspect of the present invention is the client terminal according to the 1st aspect of the present invention, wherein the state information is information used when the content is used.

The 4th aspect of the present invention is the client terminal according to the 2nd aspect of the present invention, wherein the state information is information used when the content is used.

The 5th aspect of the present invention is the client terminal according to the 1st aspect of the present invention, wherein the state information includes at least an identifier of the content, a method for use of the content, and information about a time limit for use of the content.

The 6th aspect of the present invention is the client terminal according to the 2nd aspect of the present invention, wherein the state information includes at least an identifier of the content, a method for use of the content, and information about a time limit for use of the content.

The 7th aspect of the present invention is the client terminal according to the 1st aspect of the present invention, wherein the state information is information which shows one process among a series of processes when the content is used.

The 8th aspect of the present invention is the client terminal according to the 2nd aspect of the present invention, wherein the state information is information which shows one process among a series of processes when the content is used.

The 9th aspect of the present invention is the client terminal according to the 1st aspect of the present invention, wherein the state information is identification information of a user, utilized when the content is used.

The 10th aspect of the present invention is the client terminal according to the 2nd aspect of the present invention, wherein the state information is identification information of a user, utilized when the content is used.

The 11th aspect of the present invention is the client terminal according to the 1st aspect of the present invention, wherein the state information is a use history of the content.

The 12th aspect of the present invention is the client terminal according to the 2nd aspect of the present invention, wherein the state information is a use history of the content.

The 13th aspect of the present invention is a content utilizing system wherein a client terminal acquires a content from a server connected through a network to the client terminal and uses the content;

the client terminal comprising:

a first application unit which transmits and receives data to the server; and a second application unit which transmits and receives data to the first application unit;

the second application unit including:

a content information acquiring unit which acquires content information about the content beforehand;

an instruction transmitting unit which transmits an instruction to the first application unit to process a work derived from the content information; and a state holding and transmitting unit which holds state information indicating a state of the second application unit and transmits the state information to the first application unit;

the first application unit including:

a request generation unit which generates a request command for the server, based on the instruction received from the instruction transmitting unit;

a state addition unit which adds the state information received from the state holding and transmitting unit, to the request command generated by the request generation unit; and a request transmitting unit which transmits the request command to which the state information is added, to the server;

the server comprising:

a request receiving unit which receives the request command transmitted from the client terminal;

a state information extracting unit which extracts the state information from the received request command;

a response generation unit which generates a response command for the client terminal, based on the instruction and the state information which are included in the received request command; and a response transmitting unit which transmits the response command generated by the response generation unit, to the client terminal.

The 14th aspect of the present invention is the content utilizing system according to the 13th aspect of the present invention, wherein the request command which is generated by the request generation unit is an HTTP request; and the state addition unit adds the state information to an extension area of a header of the HTTP request.

The 15th aspect of the present invention is a data transmitting/receiving method in a content utilizing system wherein a client terminal acquires a content from a server connected through a network to the client terminal and uses the content, the data transmitting/receiving method comprising:

a content information acquiring step of acquiring, by a second application unit of the client terminal, content information about the content beforehand;

an instruction transmitting step of transmitting, by the second application unit, an instruction to process a work derived from the content information, to a first application unit of the client terminal;

a state information transmitting step of holding, by the second application unit, state information indicating a state of the second application unit and transmitting the state information to the first application unit;

a request generation step of generating, by the first application unit, a request command for the server, based on the instruction;

a state addition step of adding, by the first application unit, the state information to the request command generated in the request generation step;

a request transmitting step of transmitting, by the first application unit, the request command to which the state information was added, to the server;

a response generation step of generating, by the server, a response command for the client terminal, based on the instruction and the state information which are included in the received request command; and a response transmitting step of transmitting, by the server, the generated response command to the client terminal.

The 16th aspect of the present invention is a non-transitory computer-readable medium having a program stored thereon, wherein the program causes a computer to execute the data transmitting/receiving method according to the 15th aspect of the present invention.

The present invention can provide the client terminal, the content utilizing system, the data transmitting/receiving method and the like, which can make the state information of the second application of the client terminal be handed over to the first application which has the browser function, and can notify the state information to the server smoothly.

BRIEF DESCRIPTION OF THE DRAWINGS

FIG. 11 is a diagram showing an example of a communication data when the client terminal notifies the server of capability information of the client terminal as the state information, according to the second embodiment of the present invention.

REFERENCE SIGNS LIST

Figure 1:
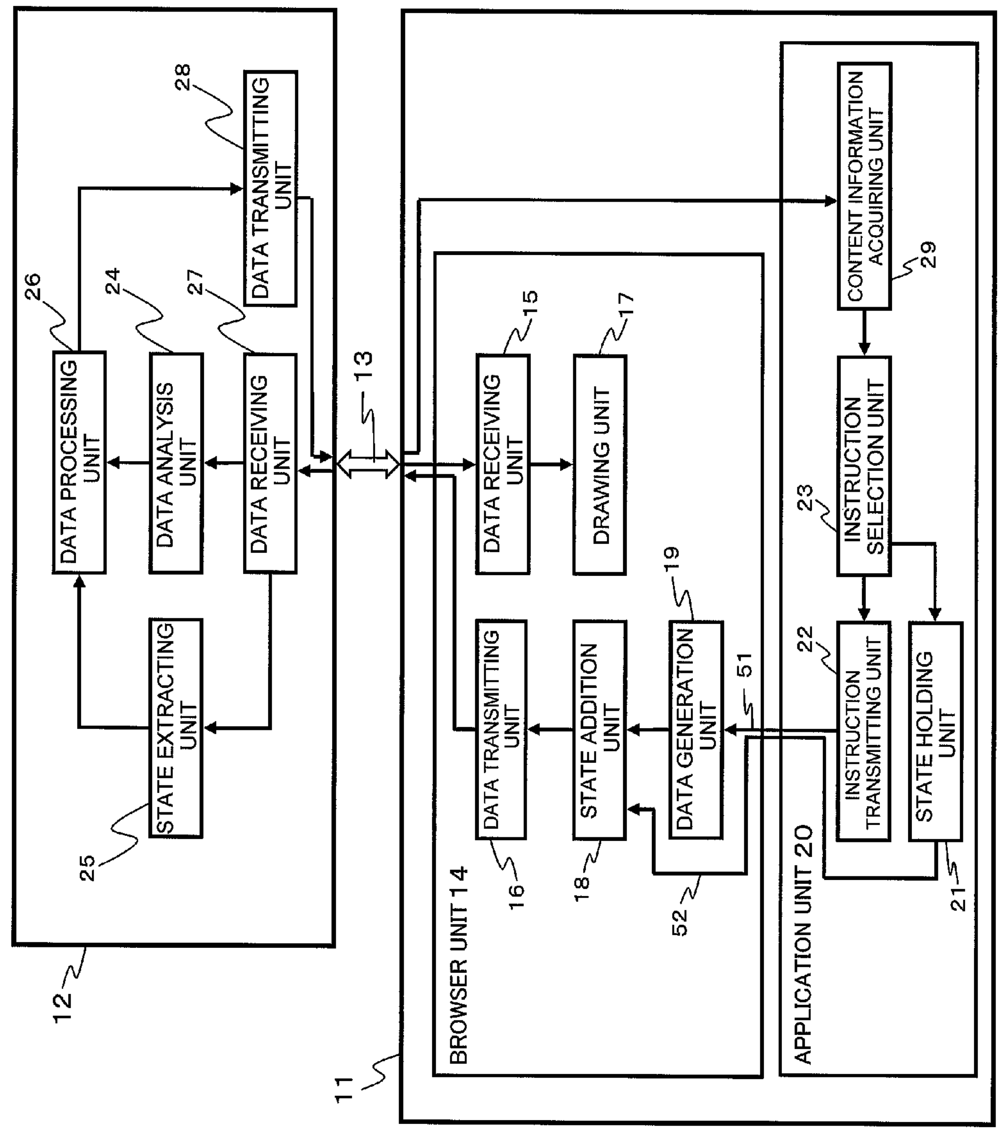
FIG. 1 is a block diagram showing an example of a configuration of a server client system according to a first embodiment and a second embodiment of the present invention.

11 Client terminal
12 Server

13 Network
14 Browser unit
15 Data receiving unit
16 Data transmitting unit
17 Drawing unit
18 State addition unit
19 Data generation unit
20 Application unit
21 State holding unit
22 Instruction transmitting unit
23 Instruction selection unit
24 Data analysis unit
25 State extracting unit
26 Data processing unit
27 Data receiving unit
28 Data transmitting unit
29 Content information acquiring unit
31 Purchase button
S41 Acquiring content information
S42 Content purchase
S43 Starting browser
S44 Adding an operation state to a header and generating an HTTP request
S45 Content purchase page demand
S46 Data analysis
S47 State extraction
S48 HTML generation
S49 Transmitting content purchase HTML
45 Purchase confirmation screen
46 Content purchase page
51 URL information
52 Operation state
61 Request line
62 Message header
63 State information
200 HTTP request
201 Request line
202 Message header
203 Empty line
204 Massage body

DETAILED DESCRIPTION

Embodiments to which the present invention is applied are described in detail below with reference to the drawings.

(First Embodiment)

FIG. 1 shows a block diagram of a configuration of a server client system according to a first embodiment of the present invention.

The first embodiment is the server client system which uses a client terminal 11 which has an application unit 20 and a browser unit 14 and is connectable with a network 13, and a server 12.

This server client system makes a continuation of the processing which the application unit 20 in the client terminal 11 performs, and shifts to the browser unit 14 smoothly without redundant operation. In this server client system, by adding state information of the application unit 20 to an HTML header and by transmitting it to the server 12 through the browser unit 14, necessary information can be acquired from the server 12 to be displayed on the browser unit 14.

Therefore, the necessary information can be extracted out of information which the server 12 offers, by using the application unit 20 and the browser unit 14.

As shown in FIG. 1, the server client system according to the first embodiment comprises the client terminal 11 and the server 12 connected by the network 13. The network 13 is internet, intranet, or the like, and is a radio network, a cable network or the like.

The client terminal 11 comprises the application unit 20 and the browser unit 14.

The application unit 20 includes an instruction transmitting unit 22, an instruction selection unit 23, a state holding unit 21 and a content information acquiring unit 29.

The browser unit 14 includes a data generation unit 19, a state addition unit 18, a data transmitting unit 16, a data receiving unit 15 and a drawing unit 17.

The browser unit 14 corresponds to an example of a first application unit according to the present invention. The application unit 20 corresponds to an example of a second application unit according to the present invention, and is used as the exclusive application which is described in the background of the invention. The state holding unit 21 corresponds to an example of a state holding and transmitting unit according to the present invention. The data generation unit 19 corresponds to an example of a request generation unit according to the present invention. The data transmitting unit 16 corresponds to an example of a request transmitting unit according to the present invention.

The application unit 20 has received content information such as a list of contents, an attribute of the content or the like, from the server 12 beforehand. The application unit 20 displays the content information in a list, accepts a selection operation of the user or the like and performs an operation concerning the content.

The content information acquiring unit 29 acquires the content information from the server 12 beforehand using Web API, and stores it in the client terminal 11.

The instruction selection unit 23 accepts a content which is selected from the content information list stored in the client terminal 11, and an instruction for the content, or the like.

The instruction transmitting unit 22 transmits the accepted instruction or the like to the browser unit 14.

The state holding unit 21 holds content information about the content selected by the instruction selection unit 23, and holds the accepted instruction or the like, and transmits these to the browser unit 14.

The browser unit 14 is started by an instruction from the application unit 20. The browser unit 14 receives an operation state of the application unit 20 as an argument for the time of the starting, and performs processing according to the operation state of the application unit 20.

The data generation unit 19 generates a request sentence for a processing which the browser unit 14 requests to the server 12. The data generation unit 19 generates the request sentence based on the argument received from the application unit 20, and generates an HTTP request here.

The browser unit 14 is not limited to being started by the application unit 20 but can be started by other instruction for the client terminal 11 such as a key input.

As a notice method, from the application unit 20 to the browser unit 14, of the operation state of the application unit 20 held in the state holding unit 21, a method of a delivery through a shared memory or through a socket communication or the like can be used instead of using the argument at the starting time mentioned above.

The state addition unit 18 adds the information of the operation state of the application unit 20 which is acquired from the state holding unit 21, to an extension area in the header of the HTTP request generated by the data generation unit 19.

The data transmitting unit 16 transmits to the server 12 a communication data having the HTTP request sentence to which the operation state of the application part 20 has been added by the state addition unit 18.

The data receiving unit 15 receives and analyzes the communication data transmitted from the server 12.

The drawing unit 17 draws it on a screen according to the result analyzed in the data receiving unit 15.

The server 12 comprises a data receiving unit 27, a data analysis unit 24, a state extracting unit 25, a data processing unit 26 and a data transmitting unit 28.

The data receiving unit 27 corresponds to an example of a request receiving unit according to the present invention. The state extracting unit 25 corresponds to an example of a state information extracting unit according to the present invention. The data processing unit 26 corresponds to an example of a response generation unit according to the present invention. The data transmitting unit 28 corresponds to an example of a response transmitting unit according to the present invention.

The data receiving unit 27 receives a communication data such as a command from the client terminal 11.

The data analysis unit 24 analyzes the communication data received by the data receiving unit 27, and transmits a request command to the data processing unit 26.

The state extracting unit 25 analyzes the extension area of the header contained in the communication data which the data receiving unit 27 received. When the information about the operation state of the client terminal 11 is included in the extension area, the state extracting unit 25 extracts the operation state of the client terminal 11 from the extension area, and notifies it to the data processing unit 26.

The data processing unit 26 performs processing using the operation state of the client terminal 11 notified from the state extracting unit 25 and the request command received from the data analysis unit 24. For example, in the case of this processing, the data processing unit 26 displays a specific page according to the operation state transmitted from the client terminal 11, performs a setup about a specific item beforehand, and generates a page.

The data transmitting unit 28 processes the result of the processing performed by the data processing unit 26 as a communication data, according to the command communication received from the client terminal 11, and transmits it to the client terminal 11.

As a concrete example which uses a server client system of the first embodiment, a contents distribution service in which the client terminal 11 connected to the internet requests and purchases a content from the server 12, is described below.

The server 12 stores image contents, such as a movie, and performs the contents distribution service which distributes them to the client terminal 11 through the network 13 which is an internet circuit.

A user operates the application unit 20 in the client terminal 11, and searches a content which the server 12 offers. The user checks the detailed information or the like of the searched content by using the browser unit 14. Then the user can request from the server 12 the purchase or the rental use concerning the selected content.

The user decides a content to be purchased or to be rented for use, by using such a contents distribution service. The client terminal 11 downloads the content from the server 12 through the network 13 which is the internet.

The user can view the downloaded content by using the application unit 20.

Figure 2:
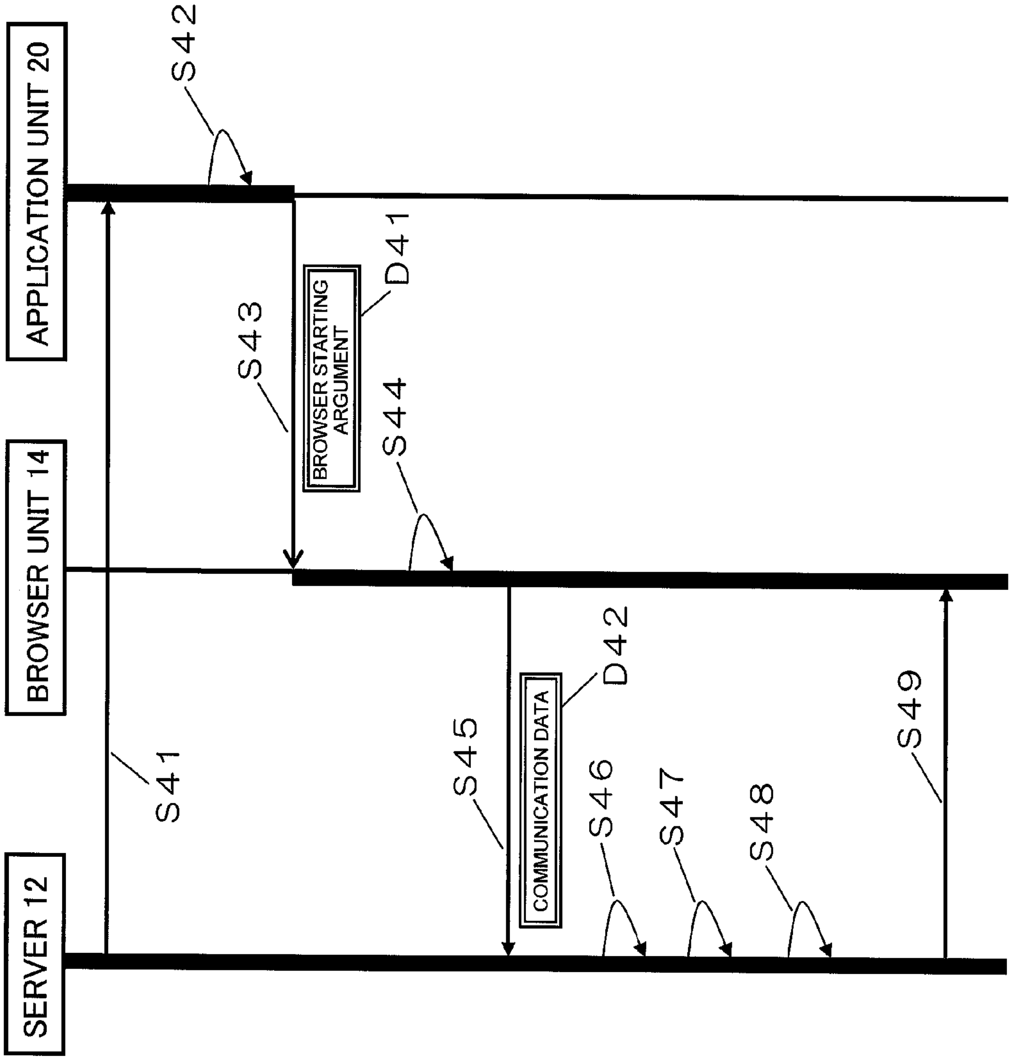
FIG. 2 is a diagram showing a flow of processing at the time of content purchase in the server client system according to the first embodiment of the present invention.

In the server client system according to the first embodiment shown in FIG. 1, the processing in the client terminal 11 and the server 12 when the user purchases the content, is described using the sequence diagram shown in FIG. 2.

FIG. 2 is a diagram showing a flow of processing at the time of content purchase in the server client system according to the first embodiment.

The user operates the client terminal 11 and acquires a list of the contents which can be rented from the server 12. When the application unit 20 receives an instruction from the user, the contents information acquiring unit 29 receives a contents purchase list information from the server 12 using Web API and stores it in the client terminal (step S41), and displays the list of contents as shown in FIG. 3(A).

Figure 3:
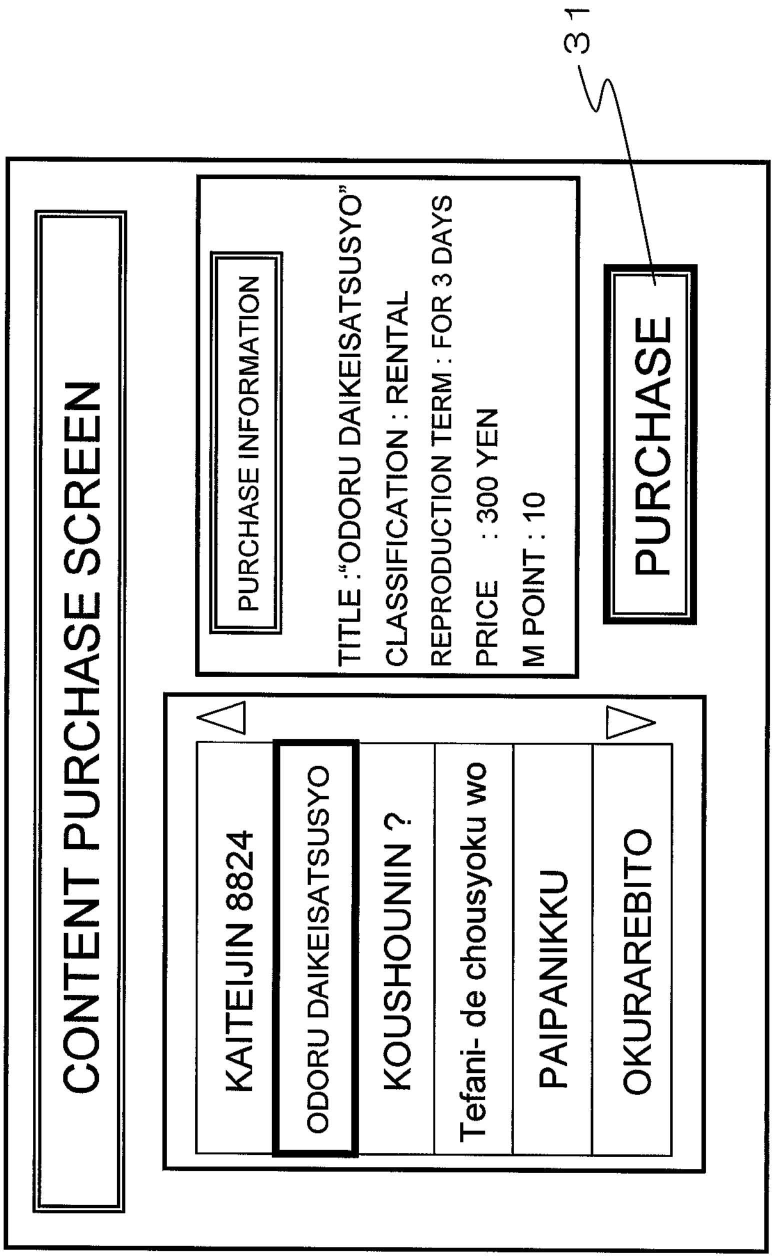
FIG. 3(A) is a diagram showing an image of a list screen of content purchase displayed on a client terminal according to the first embodiment of the present invention.
FIG. 3(B) is a diagram showing an image of a screen which urges a user to make the conclusive confirmation of purchase, displayed on the client terminal according to the first embodiment of the present invention.
FIG. 3(C) is a diagram showing an image of a screen of content purchase page displayed on the client terminal according to the first embodiment of the present invention.
Figure 3:
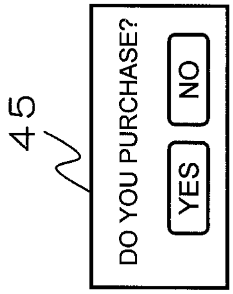
Figure 3:
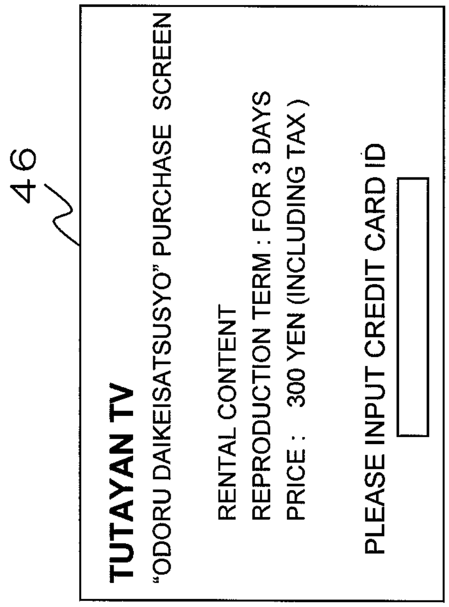

FIG. 3(A) shows an example of a screen displayed on the client terminal 11 when the user operates the client terminal 11 and rents a content from the server 12. FIG. 3(B) shows an example of a screen which urges the user to make the conclusive confirmation of purchase, when the user pushes a purchase button 31 at the screen of FIG. 3(A).

When the user decides the content to rent out of the list of the contents shown in FIG. 3(A), the user focuses on the content to rent and pushes the purchase button 31.

When the user pushes the purchase button 31, the client terminal 11 displays a purchase confirmation screen 45 shown in FIG. 3(B), thus urging the user to make the conclusive confirmation of carrying out rental purchase of the content.

Thus, in the server client system in the first embodiment, only the application unit 20 performs the processing of displaying a list of contents, searching a content, enabling the user to select a content and urging the user to make the conclusive confirmation of purchase, without starting the browser unit 14. In a conventional server and client system, data is delivered between the server and the browser and the above processing is performed by the server. Usability can be increased in comparison to the conventional system because only the application unit 20 performs such a processing which is performed by the server in the conventional system.

When a user shows his will which carries out rental purchase by selecting "yes" in the purchase confirmation screen 45, the application unit 20 performs a content purchase processing (step S42).

In the content purchase processing (step S42), the browser unit 14 is started by the application unit 20 (step S43).

At this time, the browser unit 14 receives a browser starting argument D41 as an argument, from the application unit 20.

Figure 4:
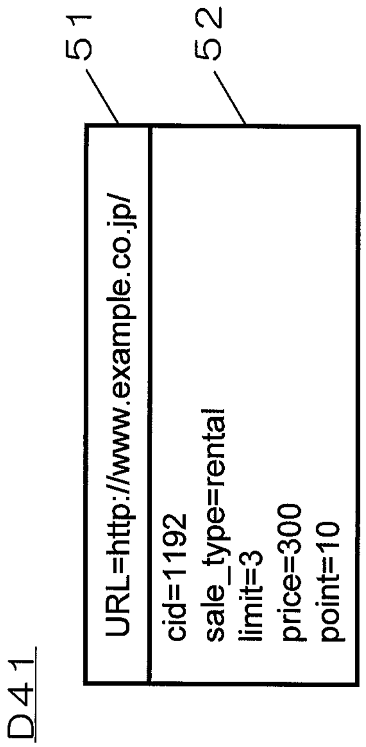
FIG. 4 is a diagram showing an example of arguments for starting a browser of the server client system according to the first embodiment of the present invention.

FIG. 4 shows an example of the browser starting argument D41 for starting the browser unit 14.

An URL information 51 which shows the place of the server 12, and an operation state 52 are included in the browser starting argument D41. A content ID (cid), a classification (sale_type) of a rental or sale, a rental term (limit), a price (price), a special point (point) or the like which are the information of the content which the user selected in the application unit 20 just before the user pushes the purchase button 31, are included in the operation state 52.

In an HTTP request generation process (step S44), an HTTP request is generated which is communication data using the data generation unit 19, the operation state 52 is added to the header area of the HTTP about the generated HTTP request using the state addition unit 18, and the HTTP request which includes the operation state in the header is generated.

Here, although the HTTP is used as the communications protocol between the server 12 and the client terminal 11, the communications protocol is not be restricted to this.

Figure 5:
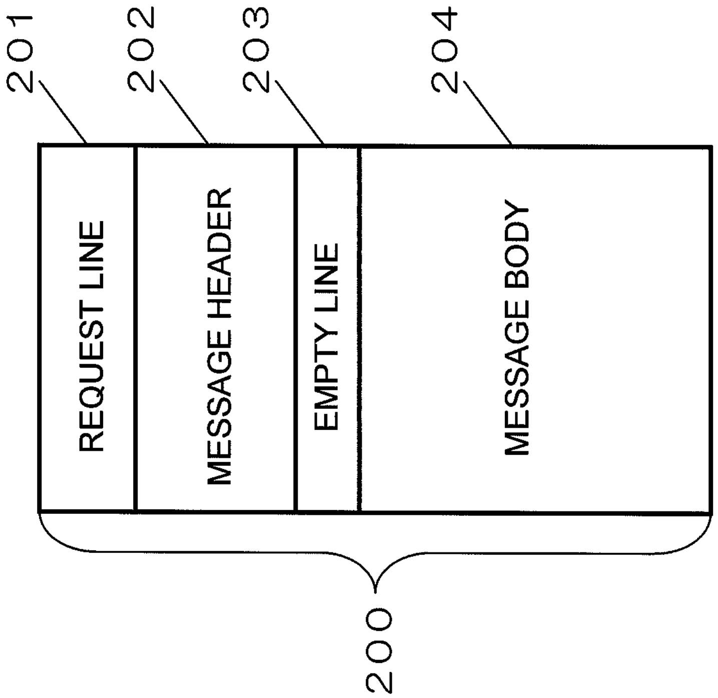
FIG. 5 is a diagram showing a structure of HTTP request.

Here, the HTTP used as communication data to the server 12 from the browser unit 14, is briefly described using FIG. 5.

FIG. 5 shows a structure of the HTTP request.

The HTTP request 200 is used for the processing demand to the server 12 from the browser unit 14. The HTTP request 200 has a request line 201, a message header 202, an empty line 203, and a message body 204.

The kind of a demand from the browser unit 14 to the server 12 or the like are described to the request line 201. An encoding type for the communication data, a host name or the like are described to the message header 202. As for the empty line 203, a newline character is used as a separator of the message header 202 and the message body 204. The data to be transmitted to the server 12 from the browser unit 14 is described to the message body 204. The user can add an extension header to the message header 202 freely by using "X-" as a prefix.

Under RFC822 which is a standard of the HTTP, such definition is specified that a server processes by skipping the header which the server cannot interpret. Therefore, the server which cannot interpret the user definition header including "X-" as the prefix, does not output an error because of skipping of this. Moreover, when a browser defines a user definition header uniquely, adds the information and transmits an HTTP request, if a server can interpret the user definition header, the server can acquire the information in the user definition header.

By using this, in the user definition header in the first embodiment, the state information of the client terminal 11 or the like (the operation state 52) are added to the message header 202 of the HTTP request 200. When the server 12 interprets the extension header of the state information, the server 12 can acquire the state information of the client terminal 11. On the other hand, the server which cannot interpret the extension header of the state information, cannot interpret this extension header and skips, and therefore the server does not output an error. Instead, the server notifies the browser a top page or the like defined by the server and the browser can display the top page.

Thus, because only the browser unit 14 sets up the state information and transmits it to the server 12, a server client system which offers a contents distribution service can be constituted so that a client terminal can connect to a server which can interpret the state information and can connect also to an existing server without an error.

In the content purchase page demand processing (step S45) in FIG. 2, the communication data D42 which includes in the extension header of the HTTP request the operation state 52 notified to the browser unit 14 by the browser starting argument D41 from the application unit 20, is transmitted to the server 12 from the browser unit 14.

Figure 6:
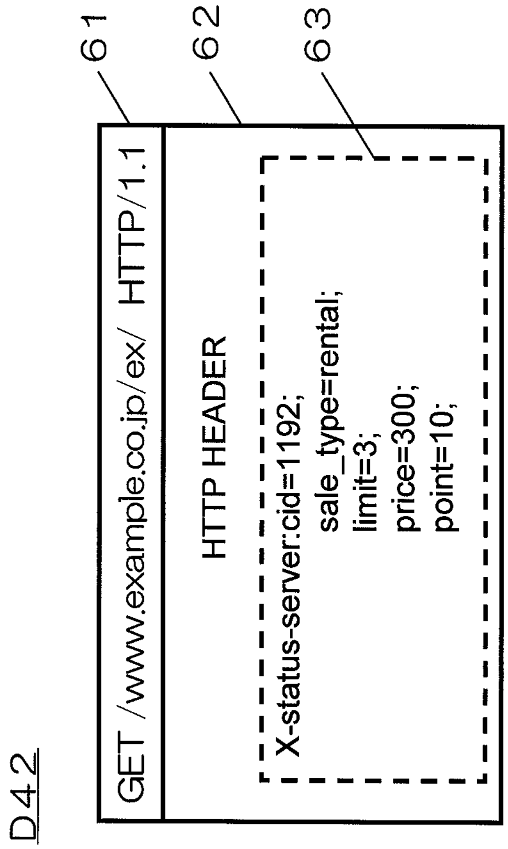
FIG. 6 is a diagram showing an example of a communication data which is transmitted by a browser unit to a server according to the first embodiment of the present invention.

FIG. 6 shows an example of the communication data D42.

The request line 61 is a request line of the HTTP request. The message header 62 is a user definition header which includes the state information 63 in addition to a usual message header.

In the data analysis processing (step S46), the HTTP request from the browser unit 14 is acquired through the data receiving unit 27, the HTTP request acquired in the data receiving unit 27 is analyzed by the data analysis unit 24, and a display demand of the content purchase page from the browser unit 14 contained in the HTTP request, is notified to the data processing unit 26.

In the state extraction processing (step S47), by the state extracting unit 25, the state information 63 is extracted from the HTTP request acquired in the data receiving unit 27, and the operation state of the user in the client terminal 11 is extracted. The content ID (cid), the classification (sale type) of rental or sale, the rental term (limit), the price (price), the special point (point) or the like about selected content are notified to the data processing unit 26 from the state extracting unit 25, as such state information of the application unit 20 that is the user's operation state.

In the HTML generation processing (step S48), the data processing unit 26 generates a content purchase page 46 of the content which the user determined to rent or purchase by using the application unit 20 based on the user's operation state notified from the state extracting unit part 25.

The content purchase page 46 of FIG. 3(C) shows an example of a screen of the content purchase page to be displayed on the client terminal 11, which is generated by the data processing unit 26 in step S48.

In the content purchase HTML transmitting processing (step S49), the data transmitting unit 28 processes the content purchase page 46 of the content which is generated in the HTML generation processing (step S48), into a communication data and transmits the communication data to the client terminal 11.

The browser unit 14 in the client terminal 11 receives and analyzes the communication data from the server 12, and displays (step S49) the content purchase page 46 of the content generated in the HTML generation processing (step S48), by the drawing unit 17.

By a series of above processing, the user, by only operating the application unit 20 in the client terminal 11, can read the content purchase page 46 of the content which is determined to be rented or purchased. For rental use of the content or the like, the user does not need to start the browser anew and look for a content from the top page of the content distribution service in the server 12, thus enabling the user to rent the content which the server 12 offers, by easy operation.

In the first embodiment, the operation state 52 which indicates the state of the client terminal 11, is notified to the server 12 by the extension header of the HTTP request. But, the state of the client terminal 11 can be notified to the server 12 by methods other than this. For example, the state of the client terminal 11 can be notified to the server 12 by using a query system.

However, when notifying using a query system, a query must be defined uniquely. It becomes an error when the server 12 cannot process the query which is transmitted to the server 12 from the client terminal 11, and an error screen such as "501 Not Implemented" is displayed on the client terminal 11. Especially, when the application unit 20 is an exclusive application program installed in the client terminal 11 and such an error is displayed, the user cannot understand a solution and may get confused.

Instead of using the query system in which an original definition is required at both the server and the client terminal, as described in the first embodiment, by handing over the state of the application unit 20 which is handed over to the browser unit 14, to the server 12 by using the standardized extension header of the HTTP request, this problem is avoidable.

Namely, by using the extension header of the HTTP request, even when the HTTP request is transmitted to the server which cannot interpret the user definition header which includes the state information 63, an error is not displayed, but the top page of the server or the like is displayed, and it can prevent the user from getting confused.

In the first embodiment, the content information acquiring unit 29 of the application unit 20 receives the content purchase list information from the server 12 by using Web API. Instead of acquiring the content purchase list information through a network, the content purchase list information can be acquired from a memory medium, such as CD and DVD for example.

In the first embodiment, a model in which the application unit 20 and the browser unit 14 operate within the client terminal 11, is described. However, it is not necessary to restrict to the client terminal 11, it can be realized with the application software and the browser software as a program which runs on a PC.

Moreover, the application unit 20 and the browser unit 14 can be constituted with arbitrary applications which run on the client terminal 11. It can be constituted so that the browser unit 14 is an application which can communicate with the server 12 directly and the application unit 20 is an application which communicates with the server 12 indirectly through the browser unit 14.

(Second Embodiment)

In the first embodiment, the operation state of the client terminal 11 is transmitted by transmitting the information of the content ID, the classification of a rental or sale, the rental term or the like from the client terminal 11 to the server 12. Besides this, there are some modifications as the state information in the client terminal 11.

These modifications are described in a second embodiment of the present invention.

A configuration of a server client system in the second embodiment is the same as that of the first embodiment, and a block diagram of the configuration is as shown in FIG. 1.

Figure 7:
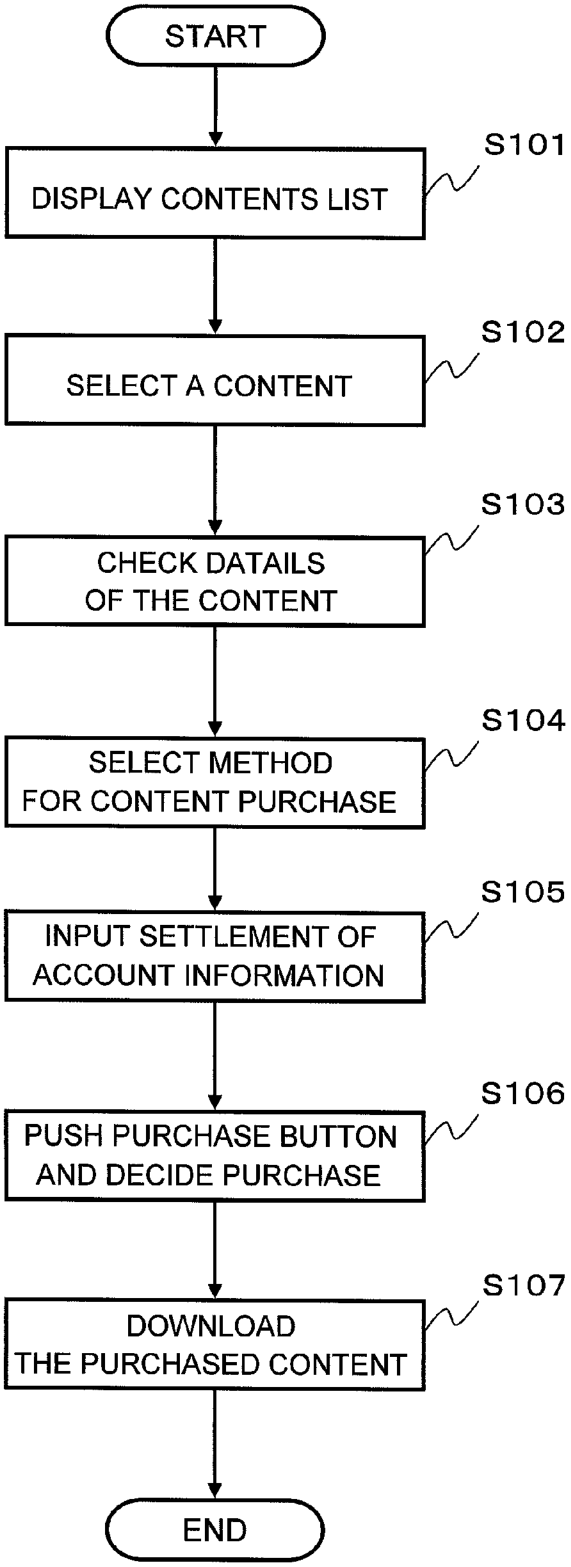
FIG. 7 is a chart showing a flow of processing at the time of content purchase in the server client system according to the second embodiment of the present invention.

FIG. 7 is a chart showing a flow of processing at the time of content purchase in the server client system according to the second embodiment.

In the second embodiment, the application unit 20 and the browser unit 14 in the client terminal 11 notify the state of the processing in the client terminal 11 to the server 12 through the browser unit 14.

The flow of the content purchase processing in the client terminal 11 includes a step which displays a contents list (step S101), a step which selects content (step S102), a step which checks details of the content (step S103), a step which selects a method for purchase (step S104), a step which inputs settlement of accounts information (step S105), a step which decides purchase (step S106), and a step which downloads the purchased content (step S107).

The application part 20 and the browser unit 14 notify the server 12 in which state of the above mentioned steps the client terminal 11 is in, through the browser unit 14. The server 12 which received the notice generates a response screen according to the notice, and transmits the response screen to the client terminal 11 for response. The state notified to the server 12 indicates how far the user is operating in the application unit 20 and the browser unit 14.

Figure 8:
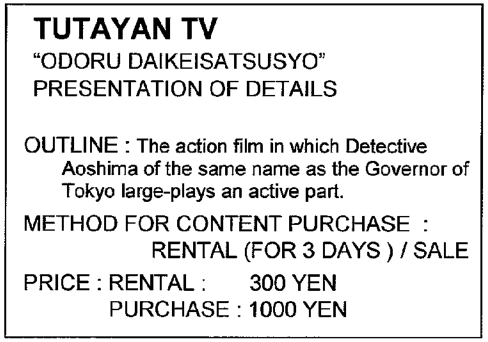
FIG. 8(A) is a diagram showing an image of a screen which presents detail of a content, displayed on a client terminal according to the second embodiment of the present invention.
FIG. 8(B) is a diagram showing an image of a selection screen of methods for content purchase displayed on the client terminal according to the second embodiment of the present invention.
FIG. 8(C) is a diagram showing an image of a settlement of accounts information screen displayed on the client terminal according to the second embodiment of the present invention.
FIG. 8(D) is a diagram showing an image of a content purchase confirmation screen displayed on the client terminal according to the second embodiment of the present invention.
Figure 8:
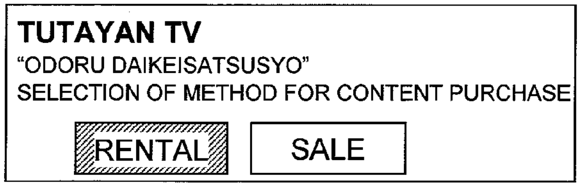
Figure 8:
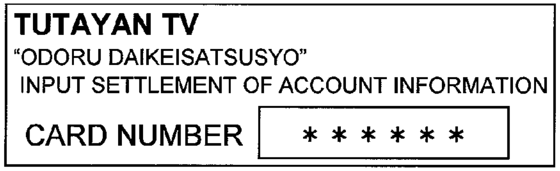
Figure 8:
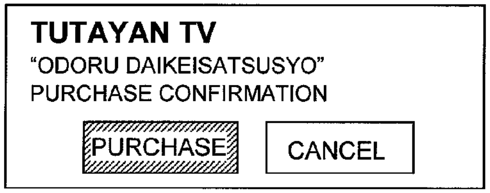

FIG. 8(A) to FIG. 8(D) show examples of a screen displayed on the client terminal 11 in the second embodiment, respectively. FIG. 8(A) shows a screen which presents details of the content selected by the user. FIG. 8(B) shows a selection screen of a method for content purchase. FIG. 8(C) shows a settlement of accounts information screen. FIG. 8(D) shows a content purchase confirmation screen.

For example, when the client terminal 11 is in the state where the user is selecting a content at the client terminal 11, it is notified to the server 12 that the client terminal 11 is in the state of step 5102. Then, the server 12 generates the screen of FIG. 8(A) which presents details of the content which is a screen expected after step 5102, and the server 12 transmits the screen to the client terminal 11. The browser unit 14 shows to the user the screen of FIG. 8(A).

When the client terminal 11 is in the state where the user is checking the details of the content at the client terminal 11, the client terminal 11 notifies to the server 12 that it is in the state of step S103. The server 12 transmits the selection screen of the method for content purchase of FIG. 8(B) which is a screen expected after step S103, to the client terminal 11.

When the client terminal 11 is in the state where the user is selecting the method for content purchase for the selected content at the client terminal 11, the client terminal 11 notifies to the server 12 that it is in the state of step S104. The server 12 transmits the settlement of accounts information screen of FIG. 8(C) which is a screen expected after step S104, to the client terminal 11.

When the client terminal 11 is in the state where the user has inputted the settlement of accounts information at the client terminal 11, the client terminal 11 notifies to the server 12 that it is in the state of step S105. The server 12 transmits the content purchase confirmation screen of FIG. 8(D) which is a screen expected after step S105, to the client terminal 11.

By processing in this way in the second embodiment, even when any processing among the content purchase processing is being performed, suitable screen data which should be displayed next is generated by the server 12, and the screen can be displayed on the client terminal 11.

In the above, the information which is transmitted to the server 12 and shows in which state of steps the client terminal 11 is in, corresponds to an example of information which shows one process among a series of processes according to the present invention.

It can be said that the operation of the server client system described in the first embodiment corresponds to such proceedings that when the browser unit 14 notifies information including the content ID, the classification of a rental or sale, the rental term or the like as the state of step S104, to the server 12 after the application unit 20 in the client terminal 11 performs the processing from the step S101 to the step S104 in FIG. 7.

Member information of users at such a site for a mail order can be used as the state information of the client terminal 11 notified to the server 12. There are a member ID and a password as the member information. When the browser unit 14 of the client terminal 11 connects with the mail order site, its tie-up site or the like, the saved member ID and the saved password are transmitted from the application unit 20 to the server 12 through the browser unit 14, and a peculiar screen for the user in the site of the server 12 is offered and so on, and thereby a state that the user is logging in or signing in to the site can be performed.

Figure 9:
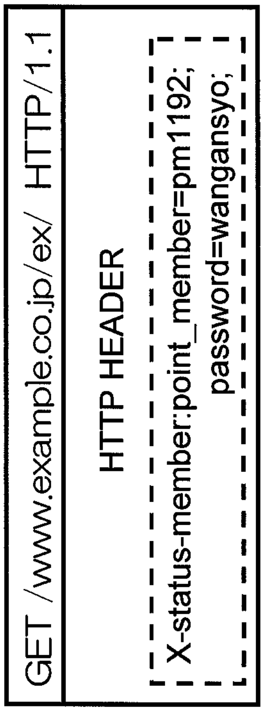
FIG. 9 is a diagram showing an example of a communication data when the client terminal notifies a server of member information as state information, according to the second embodiment of the present invention.

FIG. 9 shows an example of the communication data, for the notice of the member information as the state information in the client terminal 11 in this case, which the browser unit 14 transmits to the server 12.

In this case, the browser unit 14 stores the user ID and the password information in the extension area of the HTTP header and transmits them to the server 12.

The member information of users used as the state information in the client terminal 11 in this case corresponds to an example of identification information of a user according to the present invention.

A selection history of contents in the application unit 20 or the like can be used as the state information in the client terminal 11. The server 12 can offer information, including a list of recommended contents or the like, to the client terminal 11 in such manner that the application unit 20 memorizes the history of the content ID of the selected content and notifies it suitably to the server 12.

Figure 10:
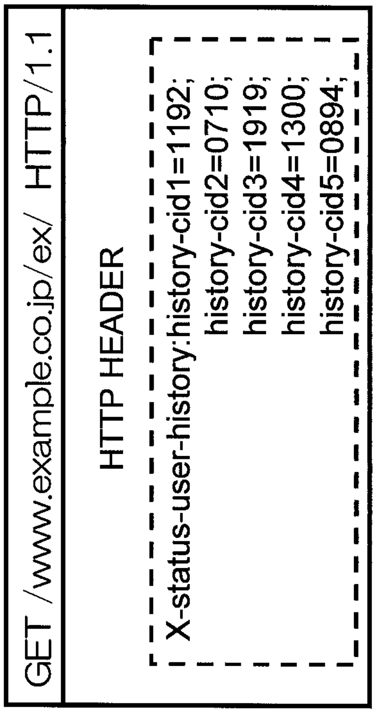
FIG. 10 is a diagram showing an example of a communication data when the client terminal notifies the server of a selection history of contents as the state information, according to the second embodiment of the present invention.

FIG. 10 shows an example of the communication data, for the notice of the selection history of the content as the state information in the client terminal 11 in this case, which the browser unit 14 transmits to the server 12.

For example, as shown in FIG. 10, the browser unit 14 stores the selection history corresponding to the past five contents in the extension area of the HTTP header and transmits it to the server 12.

The selection history of the content used as the state information in the client terminal 11 in this case corresponds to an example of a use history of the content according to the present invention.

Capability information of the client terminal 11 or the like can be used as the state information in the client terminal 11. Capability information is information about the picture resolution or display capability which the client terminal 11 permits, or information of a recording area for storing contents, or the like.

By notifying the information to the server 12, the server 12 can judge whether the content to be offered can be displayed on the client terminal 11 or not and whether the content can be stored in the client terminal 11 or not. When the capability is insufficient, the server 12 generates a caution screen or the like according to the insufficient capability and can transmit the screen to the client terminal 11. The server 12 can notify to the client terminal 11 that the content of higher quality for the purchase demanded contents can be offered.

FIG. 11 shows an example of the communication data, for the notice of the capability of the client terminal 11 as the state information in the client terminal 11 in this case, which the browser unit 14 transmits to the server 12.

In this case, the browser unit 14 stores the display capability information of the client terminal 11 in the extension area of the HTTP header and transmits it to the server 12.

The capability information of the client terminal 11 used as the state information in the client terminal 11 in this case corresponds to an example of information used when the content is used according to the present invention.

The server client system of each embodiment can make details of the content purchase processing of the application unit 20 in the client terminal 11 be handed over to the server 12 smoothly, and can make the content purchase screen offered from the server 12, displayed smoothly.

By using the content utilizing system of the present invention, the first application unit receives the operation state which the user performs using the second application unit in the client terminal. When the first application unit transmits the information to the server, the server receives the notice of the operation state from the client terminal and can perform processing according to the operation state.

The present invention is broadly applicable to not only the content distribution service but also other services which use the Web service on the internet by using the application in the client terminal.

Each block of the client terminal 11 and the server 12 shown in FIG. 1 is realizable by hardware, and is also realizable by making a CPU execute a program and by making software use the hardware resources.

Especially, when processing of the instruction transmitting unit 22 and the state holding unit 21 in the application unit 20, the data generation unit 19 and the state addition unit 18 in the client terminal 11, the state extracting unit 25 and the data processing unit 26 in the server 12, and the like are realized by software, the change of the state information of the client terminal 11 for the notice to the server 12, and the change of the data format for the notice or the like, can be performed easily and flexibly.

The non-transitory computer-readable medium of the present invention is a recording medium having recorded thereon a program of the above-described data transmitting/ receiving method of the present invention and is a recording medium, the program of which, when read, is used in cooperation with the computer.

The computer according to the present invention described above is not limited to pure hardware such as a CPU and may include firmware, an OS, and peripheral equipment.

Industrial Applicability

The client terminal, the content utilizing system, the data transmitting/receiving method and the like according to the present invention have an effect that, enable making the state information of the second application of the client terminal be handed over to the first application which has the browser function, and enable notifying the state information to the server smoothly and are useful as a content distribution service by which a content is purchased from a digital television, a mobile AV terminal, a mobile phone or the like, a client terminal, a data transmitting/receiving method or the like which is used in the content distribution service.

What is claimed is:

1. A client terminal which acquires a content from a server connected through a network to the client terminal and uses the content, the client terminal comprising:

a processor; and a non-transitory memory having executable instructions stored thereon, which when executed by the processor, cause the client terminal to function as:

a browser unit which transmits and receives data to and from the server; and an application unit which transmits and receives data to and from the browser unit, wherein the application unit includes:

a content information acquiring unit which acquires content information about the content beforehand;

an instruction transmitting unit which transmits an instruction to the browser unit to process a work derived from the content information; and a state holding and transmitting unit which holds state information indicating (i) a state of the second application unit and (ii) capability of the client terminal, and transmits the state information to the browser unit, wherein the browser unit includes:

a request generation unit which generates a request command for the server, based on the instruction received from the instruction transmitting unit;

a state addition unit which adds the state information received from the state holding and transmitting unit, to the request command generated by the request generation unit;

a request transmitting unit which transmits the request command to which the state information is added, to the server, wherein the request command which is generated by the request generation unit is an HTTP request, and wherein the state addition unit adds the state information to an extension area of a header of the HTTP request.

2. The client terminal according to claim 1, wherein the state information is information used when the content is used.

3. The client terminal according to claim 1, wherein the state information includes at least an identifier of the content, a method for use of the content, and information about a time limit for use of the content.

4. The client terminal according to claim 1, wherein the state information is information which shows one process among a series of processes when the content is used.

5. The client terminal according to claim 1, wherein the state information is identification information of a user, utilized when the content is used.

6. The client terminal according to claim 1, wherein the state information is a use history of the content.

7. A content utilizing system comprising:

a server; and a client terminal which acquires a content from the server through a network, wherein the client terminal includes:

a processor; and a non-transitory memory having executable instructions stored thereon, which when executed by the processor, cause the client terminal to function as:

a browser unit which transmits and receives data to the server; and an application unit which transmits and receives data to the browser unit;

wherein the second application unit includes:

a content information acquiring unit which acquires content information about the content beforehand;

an instruction transmitting unit which transmits an instruction to the browser unit to process a work derived from the content information; and a state holding and transmitting unit which holds state information indicating (i) a state of the application unit and (ii) capability of the client terminal, and transmits the state information to the browser unit, wherein the browser unit includes:

a request generation unit which generates a request command for the server, based on the instruction received from the instruction transmitting unit;

a state addition unit which adds the state information received from the state holding and transmitting unit, to the request command generated by the request generation unit; and a request transmitting unit which transmits the request command to which the state information is added, to the server, wherein the server (i) receives the request command transmitted from the client terminal, (ii) extracts the state information from the received request command, (iii) generates a response command for the client terminal, based on the instruction and the state information which are included in the received request command, and (iv) transmits the generated response command to the client terminal, wherein the request command which is generated by the request generation unit is an HTTP request, and wherein the state addition unit adds the state information to an extension area of a header of the HTTP request.

8. A data transmitting/receiving method in a content utilizing system wherein a client terminal acquires a content from a server connected through a network to the client terminal and uses the content, the data transmitting/receiving method comprising:

a content information acquiring step of acquiring, by a an application unit of the client terminal, content information about the content beforehand;

an instruction transmitting step of transmitting, by the application unit, an instruction to process a work derived from the content information, to a browser unit of the client terminal;

a state information transmitting step of holding, by the application unit, state information indicating (i) a state of the application unit and (ii) capability of the client terminal, and transmitting the state information to the browser unit;

a request generation step of generating, by the browser unit, a request command for the server, based on the instruction;

a state addition step of adding, by the browser unit, the state information to the request command generated in the request generation step;

a request transmitting step of transmitting, by the browser unit, the request command to which the state information was added, to the server;

a response generation step of generating, by the server, a response command for the client terminal, based on the instruction and the state information which are included in the received request command; and a response transmitting step of transmitting, by the server, the generated response command to the client terminal, wherein the request command which is generated by the request generation step is an HTTP request, and wherein the state addition step includes adding the state information to an extension area of a header of the HTTP request.

9. A non-transitory computer-readable medium having a program stored thereon, wherein the program causes a computer to execute the data transmitting/receiving method according to claim 8.

* * * * *